United States Patent
Burns et al.

(10) Patent No.: US 7,433,904 B1
(45) Date of Patent: Oct. 7, 2008

(54) BUFFER MEMORY MANAGEMENT

(75) Inventors: Bruce Burns, Westford, MA (US);
Michael Tsukernik, Newton, MA (US);
Jamie Mulderig, Sutton, MA (US);
Joseph Tompkins, Westborough, MA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 470 days.

(21) Appl. No.: 10/785,912

(22) Filed: Feb. 24, 2004

(51) Int. Cl.
*G06F 12/00* (2006.01)
*G06F 9/46* (2006.01)

(52) U.S. Cl. ............... 707/206; 718/102; 718/103; 711/168; 370/232; 370/412; 370/422

(58) Field of Classification Search .......... None
See application file for complete search history.

(56) References Cited

U.S. PATENT DOCUMENTS

| | | | |
|---|---|---|---|
| 5,167,033 A * | 11/1992 | Bryant et al. | 709/235 |
| 5,748,630 A | 5/1998 | Bergantino et al. | |
| 5,748,631 A | 5/1998 | Bergantino et al. | |
| 5,794,025 A | 8/1998 | Bergantino et al. | |
| 5,860,148 A | 1/1999 | Bergantino et al. | |
| 5,970,107 A | 10/1999 | Bleiweiss et al. | |
| 6,011,823 A | 1/2000 | Bleiweiss et al. | |
| 6,122,337 A | 9/2000 | Bleiweiss et al. | |
| 6,128,303 A | 10/2000 | Bergantino et al. | |
| 6,144,714 A | 11/2000 | Bleiweiss et al. | |
| 6,359,861 B1 * | 3/2002 | Sui et al. | 370/230 |
| 6,370,534 B1 * | 4/2002 | Odom et al. | 707/100 |
| 6,516,320 B1 * | 2/2003 | Odom et al. | 707/101 |
| 6,707,792 B1 * | 3/2004 | Volftsun et al. | 370/235 |
| 2001/0052117 A1 * | 12/2001 | Holzle et al. | 717/5 |
| 2004/0117791 A1 * | 6/2004 | Prasad et al. | 718/100 |
| 2005/0096970 A1 * | 5/2005 | Weber | 705/11 |
| 2005/0141424 A1 * | 6/2005 | Lim et al. | 370/235 |
| 2005/0149932 A1 * | 7/2005 | Hasink et al. | 718/100 |

OTHER PUBLICATIONS

"Idleness is not Sloth", by Golding et al. (Hewlett-Packard Lab. www.hpl.hp.com/research/ssp/papers/idleness.pdf, published Jun. 25, 2003). pp. 12.*
Operating System Concepts, By Silberschatz et. al. (published by John Wiley & Sons. 2002) pp. 95,96,99,163-165, 182-183.*
Operating system concepts by Abraham Silberschatz, (published by John Wiley and Sons, Inc. 2002) pp. 174,175.*
ATM traffic control in hybrid fibre-coax networks—problems and solutions by (Golmie et al.) (http://w3.antd.nist.gov/pubs/golmie_9922.pdf). pp. 1-17.*
ATM traffic control in hybrid fibre-coax networks-problems and solutions by (Golmie et al.) (published May 04, 2003) (http://w3.antd.nist.gov/pubs/golmie_9922.pdf). pp.: 1-17.*

* cited by examiner

*Primary Examiner*—Hyung Sough
*Assistant Examiner*—Kaushikkumar Patel

(57) ABSTRACT

Various systems and methods for buffer memory management are disclosed. In one embodiment a buffer memory includes at least one queue configured to store a number of buffer access tasks. Buffer reclamation logic is executed to free at least one segment of the buffer memory holding an amount of stale data. Buffer reclamation logic is also included that enables the buffer reclamation logic to submit a buffer access task to the buffer memory based upon a total number of the buffer access tasks stored in the at least one queue.

36 Claims, 8 Drawing Sheets

BUFFER MEMORY MANAGEMENT

BACKGROUND

In a various processor-based systems, buffer memories are often employed to store data on a temporary basis for various purposes. For example, in a network processor, a buffer memory may be employed to temporarily store data streams that are to be routed to other points in a network, etc. Alternatively, there are many other uses for a memory buffer as one with skill in the art can appreciate.

In some cases, the data stored in a buffer memory may become "stale" in that it is no longer needed and can be disregarded. For example, in network processors, data streams that are being transferred to a client device may become stale due to the fact that the original requester canceled the request, etc. In such case, the portions of a buffer memory holding stale data need to be reclaimed for further use. Unfortunately, in order to reclaim portions of buffer memory holding stale data, buffer reclamation functions are employed that access the buffer, thereby robbing buffer access time from primary functions of a respective processor.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
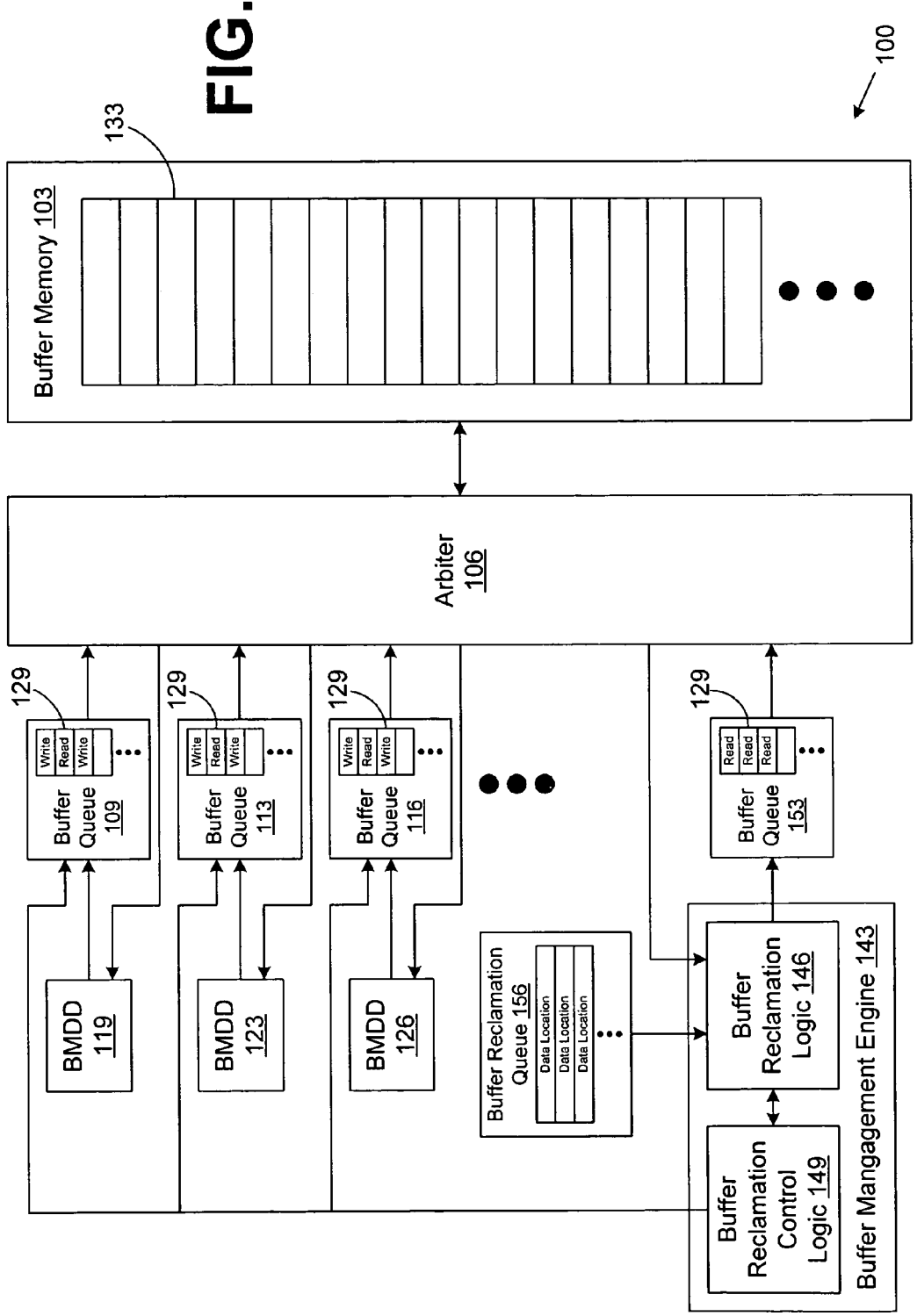
FIG. 1 is a functional block diagram of a buffer access subsystem according to an embodiment of the present invention.

With reference to FIG. 1, shown is a buffer access subsystem 100 according to an embodiment of the present invention. The buffer access subsystem 100 may be employed, for example, with various computer processor systems such as a network processor, or any other processor that requires the use of buffer memory for temporary storage of data. For example, a network processor may employ buffer memory to temporarily store data streams that are routed by the network processor to other locations on a network, etc.

The buffer access subsystem 100 includes a buffer memory 103 and an arbiter 106. A number of buffer queues 109, 113, and 116 are coupled to the arbiter 106. Also, a number of buffer memory dependent devices 119, 123, and 126 are coupled to respective ones of the buffer queues 109, 113, 116. In addition, other buffer memory dependent devices and corresponding buffer queues may exist beyond those shown. Generally, each buffer queue 109, 113, 116 is associated with a respective one of the buffer memory dependent devices 119, 123, 126. In this respect, the buffer memory dependent devices 119, 123, 126 generate buffer access tasks 129 that are placed in the respective buffer queues 109, 113, 116. In this respect, the buffer access tasks 129 may be, for example, a buffer read task or a buffer write task.

The buffer memory 103 includes a number of segments 133. Each of the segments 133 of the buffer memory 103 can store a predefined amount of data such as, for example, 128 bytes or other appropriate amount of data. Associated with each of the segments 133 of the buffer memory 103 is a segment address. The segments may also be known as "buffers" as is generally known by those with ordinary skill in the art. In this respect, the address associated with the respective segments 133 may be considered a "buffer address." A buffer access task 129 may be, for example, a read or write task in which data is read from or written to one of the segments 133.

The buffer access subsystem 100 also includes a buffer management engine 143. The buffer management engine 143 performs various functions with respect to the buffer memory 103. In this respect, the buffer management engine 143 includes various components that perform such functions. Among the components within the buffer management engine 143 are buffer reclamation logic 146 and buffer reclamation control logic 149. Associated with the buffer reclamation logic 146 is a buffer queue 153 that in turn is coupled to the arbiter 106. The buffer queue 153 is employed to submit buffer access tasks 129 generated by the buffer reclamation logic 146 to the buffer memory 103 as will be described. The buffer access tasks 129 generated by the buffer reclamation logic 146 are generally buffer read tasks, although it may be possible that such buffer access tasks 129 be buffer write tasks.

In addition, the buffer access subsystem 100 includes a buffer reclamation queue 156 that is employed to store addresses of segments 133 of the buffer memory 103 that are deemed to hold "stale" data. In this respect, "stale" data is defined herein as data that is no longer useful that may be eliminated without consequence. Various other subsystems within a processor device associated with the buffer access subsystem 100 generally determine when a particular amount of data stored within one or more segments 133 of the buffer memory 103 is stale and writes the segment addresses to the buffer reclamation queue 156. The buffer reclamation logic 146 accesses the buffer reclamation queue 156 to determine which segments 133 of the buffer memory 103 are to be reclaimed or freed for further use as required. In this respect, the buffer reclamation logic 146 takes various steps to free such segments 133 for further use by various applications and buffer memory dependent devices 119, 123, 126 as will be discussed.

Next, an explanation of the operation of the buffer access subsystem 100 is provided. To begin, generally the buffer memory dependent devices 119, 123, 126 submit buffer access tasks 129 to the buffer memory 103 by placing such buffer access tasks 129 into their respective buffer queues 109, 113, 116. The arbiter 106 continually cycles through the buffer queues 109, 113, 116, and 153 and submits the buffer access tasks 129 contained therein to the buffer memory 103. In this respect, the arbiter 106 restricts the submission of the buffer access tasks 129 to a single one of the buffer access tasks 129 at a given time. Such access is defined herein as "single threaded access" to the buffer memory 103.

Upon submission of the buffer access tasks 129 which may be, for example, read tasks or write tasks, such tasks are executed in the buffer memory 103 as is appropriate. In the event that a read task is implemented, then the data from the respective segment 133 associated with the respective buffer read task 129 is transmitted back to the requesting buffer memory dependent device 119, 123, 126 or the buffer reclamation logic 146. In performing buffer write tasks 129, the buffer memory 103 writes a value to a respective one of the segments 133.

From time to time, some of the data stored in the various segments 133 of the buffer memory 103 may become "stale" as described above. Unfortunately, while stale data is stored in any of the segments 133, they cannot be used for other data storage activity in conjunction with the operation of the buffer memory dependent devices 119, 123, 126. This reduces the amount of buffer memory 103 available for use.

To allow such segments 133 holding the stale data to be used by the respective buffer memory dependent devices 119, 123, 126, they need to be freed or reclaimed for such access. To reclaim segments 133 holding stale data, the buffer reclamation logic 146 is selectively enabled or executed to perform such tasks as are necessary to reclaim or free such segments 133 as will be described.

In freeing segments 133 holding stale data, the buffer reclamation logic 146 may submit buffer access tasks 129 to the buffer memory 103. This can be problematic due to the single threaded access that the arbiter 106 provides to the buffer memory 103. Specifically, due to the fact that the arbiter 106 provides singled threaded access to the buffer memory 103, any buffer access task 129 submitted by the buffer reclamation logic 146 necessarily displaces buffer access tasks 129 submitted by the buffer memory dependent devices 119, 123, 126. In situations where speed is at an optimum, the operation of the buffer reclamation logic 146 in this respect can serve to slow down the processes performed by the buffer memory dependent devices 119, 123, 126. This is because the buffer access tasks 129 submitted by the buffer reclamation logic 146 gets in the way of buffer access tasks 129 submitted by the buffer memory dependent devices 119, 123, 126 and, consequently, slows access to the buffer memory 103.

In accordance with various embodiments of the present invention, the buffer reclamation control logic 149 advantageously controls the enablement or execution of the buffer reclamation logic 146 so as to minimize any potential interference with the buffer access sought by the buffer memory dependent devices 119, 123, 126. In particular, in one embodiment, the buffer reclamation logic 146 is allowed to submit buffer access tasks 129 to the buffer memory 103 and free segments 133 of the buffer memory 103 holding stale data only at times of low buffer access activity on the part of the buffer memory dependent devices 119, 123, 126. Specifically, in one embodiment, the buffer reclamation control logic 149 enables the buffer reclamation logic 146 to submit buffer access tasks 129 to the buffer memory 103 based upon a total number of buffer access tasks 129 stored in all of the queues 109, 113, and 116, collectively. In this respect, the buffer reclamation control logic 149 may enable the operation of the buffer reclamation logic 146 only if the total number of buffer access tasks 129 within all of the queues 109, 113, 116 is less than a predefined threshold.

Alternatively, in another embodiment the buffer reclamation control logic may calculate a weighted moving average of the total number of buffer access tasks stored in all of the queues 109, 113, and 116 over a predefined period of time. In this respect, the buffer reclamation control logic 149 may enable or otherwise execute the operation of the buffer reclamation logic 146 to submit buffer access tasks 129 to the buffer memory 103 so as to free segments 133 of the buffer memory 103 holding stale data if the weighted moving average calculated of the total number of buffer access tasks 129 stored in all of the queues 109, 113, 116 is less than a predefined average threshold.

In addition, in still another embodiment, the buffer reclamation control logic 149 may limit the amount of time within which the buffer reclamation logic 146 may operate, thereby limiting the number of buffer access tasks 129 that the buffer reclamation logic 146 may submit to the buffer memory 103 over an extended period of time. In this respect, the buffer reclamation control logic 149 may include logic that limits the total number of buffer access tasks that the buffer reclamation logic may submit to the buffer memory 103 so as to free segments 133 of the buffer memory 103 holding stale data during a predefined period of time that is continually repeated. For example, the buffer reclamation control logic may allow the buffer reclamation logic 146 to operate only a few seconds out of every minute as time progresses.

In yet another embodiment, the buffer reclamation control logic 149 may limit the amount of time that the buffer reclamation logic 146 operates by using a time credit system. Specifically, for each period of time that lapses as time progresses, the buffer reclamation control logic 149 may issue a number of buffer access credits to be used by the buffer reclamation logic 146. In this respect, the buffer reclamation logic is only allowed to submit buffer access tasks 129 to the buffer memory 103 in order to free segments 133 of the buffer memory 103 holding stale data only upon an existence of a balance of a predefined number of the buffer access credits. In some cases credits may not be used as there may not be stale data in any of the segments 133 or some other condition prevents the submission of buffer access tasks 129 by the buffer reclamation logic 146. In such situations, the buffer access credits will accumulate up to a predefined maximum of credits. After buffer access tasks 129 have been submitted to the buffer memory 103, then the buffer reclamation control logic 149 may delete the predefined number of buffer access credits corresponding to the buffer access tasks 129 submitted.

To provide an example illustration, assume that for every minute of operation, a credit is issued for buffer memory access by the buffer reclamation logic. Also assume in this example that a single credit must exist for the buffer reclamation logic 146 to submit a buffer access task 129 to the buffer memory 103. As a consequence, the buffer reclamation logic 146 would be enabled to submit a single buffer access task 129 to the buffer memory 103 to free a segment 133 of the buffer memory 103 holding stale data every minute. If no buffer access task 129 is submitted in a given minute, for example, then the buffer access credits are accumulated up to a predefined balance comprising a maximum number of buffer access credits. As an alternative, a single credit may allow the buffer reclamation logic 146 to submit a number of buffer access tasks 129 or multiple credits may be need to submit a single buffer access task 129.

In this respect, the buffer reclamation logic 146 is thus allowed to operate to free segments 133 of the buffer memory 103 holding stale data only for a predefined amount of time over an extended period of time thereby limiting the interference caused by the submission of buffer access tasks 129 by the buffer reclamation logic 146 to the submission of buffer access tasks 129 by the buffer memory dependent devices 119, 123, 126.

In an additional alternative, the buffer reclamation control logic 149 may comprise logic that implements a hybrid or combination of the time limit and buffer activity determination approaches described above in order to determine when to enable the operation of the buffer reclamation logic 146 to free segments 133 of the buffer memory 103 holding stale data where such operation involves the submission of buffer access tasks 129 to the buffer memory 103.

In addition, the buffer reclamation logic 146 includes logic that detects errors in the stale data stored within the buffer memory 103. In particular, if a given amount of data is stored among a number of the segments 133, then the data is linked from segment-to-segment 133 by values stored within the segments 133 themselves. For example, at the beginning of each intermediate segment 133, the address of the preceding segment 133 is located. Also, at the end of a particular segment 133 of buffer memory 103, the address of the next segment 133 that continues the stale data is located. If a discontinuity occurs from segment-to-segment, then data corruption may ultimately result. Accordingly, the buffer reclamation logic 146 includes logic that detects a segment-to-segment discontinuity in the data stored in a number of segments 133 of the buffer memory 103.

If a segment to segment discontinuity is detected, then the buffer reclamation logic 146 does not free the respective segments 133 of the buffer memory 103 that hold the amount of stale data subject to the segment-to-segment discontinuity. This prevents further errors from propagating during the operation of the given processor system. Upon the detection of a segment-to-segment discontinuity, the buffer reclamation logic 146 reports the existence of the error in a given log, for example, so that corrective logic or an operator can take appropriate action to remedy the error. In the following flow charts, a more detailed description of various examples of the operation of the buffer reclamation logic 146 and the buffer reclamation control logic 149 is provided according to the various embodiments of the present invention.

According to one embodiment of the present invention, the various embodiments of the buffer reclamation logic 146 and the buffer reclamation control logic 149 may be implemented using dedicated hardware. Alternatively, the same may be implemented using software/firmware, or a combination of hardware and software/firmware. If embodied in dedicated hardware, for example, the buffer reclamation logic 146 and the buffer reclamation control logic 149 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

Figure 2:
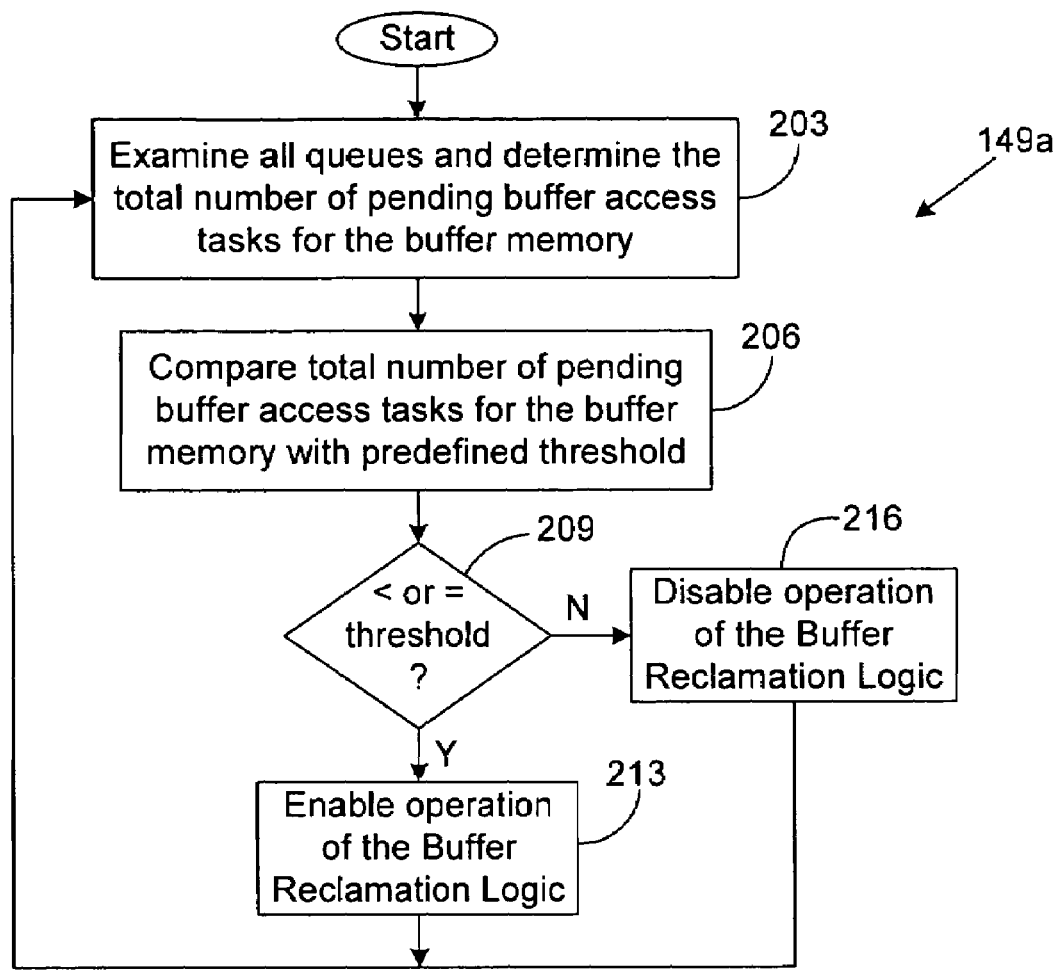
FIG. 2 is a flow chart that illustrates a first example of logic that controls the execution of buffer reclamation logic in the buffer access subsystem of FIG. 1 according to an embodiment of the present invention.

Referring next to FIG. 2, shown is a flow chart that provides one example of the operation of the buffer reclamation control logic 149, denoted herein as buffer reclamation logic 149a, according to an embodiment of the present invention. Alternatively, the flow chart of FIG. 2 may be viewed as depicting steps of a method implemented in the buffer reclamation control logic 149a to enable the operation of the buffer reclamation logic 146 (FIG. 1) to submit buffer access tasks to the buffer memory 103 (FIG. 1).

Beginning with box 203, the buffer reclamation control logic 149a first examines all of the queues 109, 113, and 116 (FIG. 1) to determine the total number of buffer access tasks 129 (FIG. 1) stored therein destined for the buffer memory 103 (FIG. 1). Thereafter, in box 206, the buffer reclamation control logic 149a compares the total number of the buffer access tasks 129 in all of the queues 109, 113, 116 with a predefined threshold value. The threshold value is defined to be a maximum number of buffer access tasks 129 that exist in all of the buffer queues 109, 113, 116 above which the operation of the buffer reclamation logic 146 is disabled. In this respect, the buffer reclamation logic 146 is prevented from performing the tasks necessary to free segments 133 of the buffer memory 103 including submitting buffer access tasks 129 to the buffer memory 103 if the number of buffer access tasks 129 in the buffer queues 109, 113, 116 is above the predefined threshold. The predefined threshold may be any number that is deemed effective based upon, for example, empirical evidence, etc.

Consequently, in box 209, if the total number of pending buffer access tasks 129 in the buffer queues 109, 113, 116 is less than or equal to the predefined threshold, then the buffer reclamation control logic 149a proceeds to box 213 in which the operation of the buffer reclamation logic 146 is enabled thereby allowing the buffer reclamation logic 146 to submit buffer access tasks 129 to the buffer memory 103 by placing such buffer access tasks 129 in the buffer queue 153 (FIG. 1) during the ordinary course of operation of the buffer reclamation logic 146. Thereafter, the buffer reclamation control logic 149a reverts back to box 203 as shown.

On the other hand, if the total number of pending buffer access tasks 129 in the buffer queues 109, 113, 116 is greater than the predefined threshold, then in box 216 the operation of the buffer reclamation logic 146 is disabled, thereby preventing the buffer reclamation logic 146 from submitting buffer access tasks 129 to the buffer memory 103. Thereafter, the buffer reclamation control logic 149a reverts back to box 203 as shown.

In this sense then the buffer reclamation control logic 149a gauges or obtains a measure of the general level of buffer access activity by determining the total number of buffer access tasks 129 stored in the buffer queues 109, 113, and 116. The buffer reclamation control logic 149a enables the operation of the buffer reclamation logic 146 to submit buffer access tasks 129 to the buffer memory 103 if the total number of buffer access tasks 129 in the buffer queues 109, 113, 116 is less than the predefined threshold. This ensures that the buffer reclamation logic 146 will not perform the tasks necessary to free segments 133 of the buffer memory 103 including submitting buffer access tasks 129 to the buffer memory 103 if the buffer access activity on the part of the buffer memory dependent devices 119, 123, 126 is above a predefined threshold level.

Figure 3:
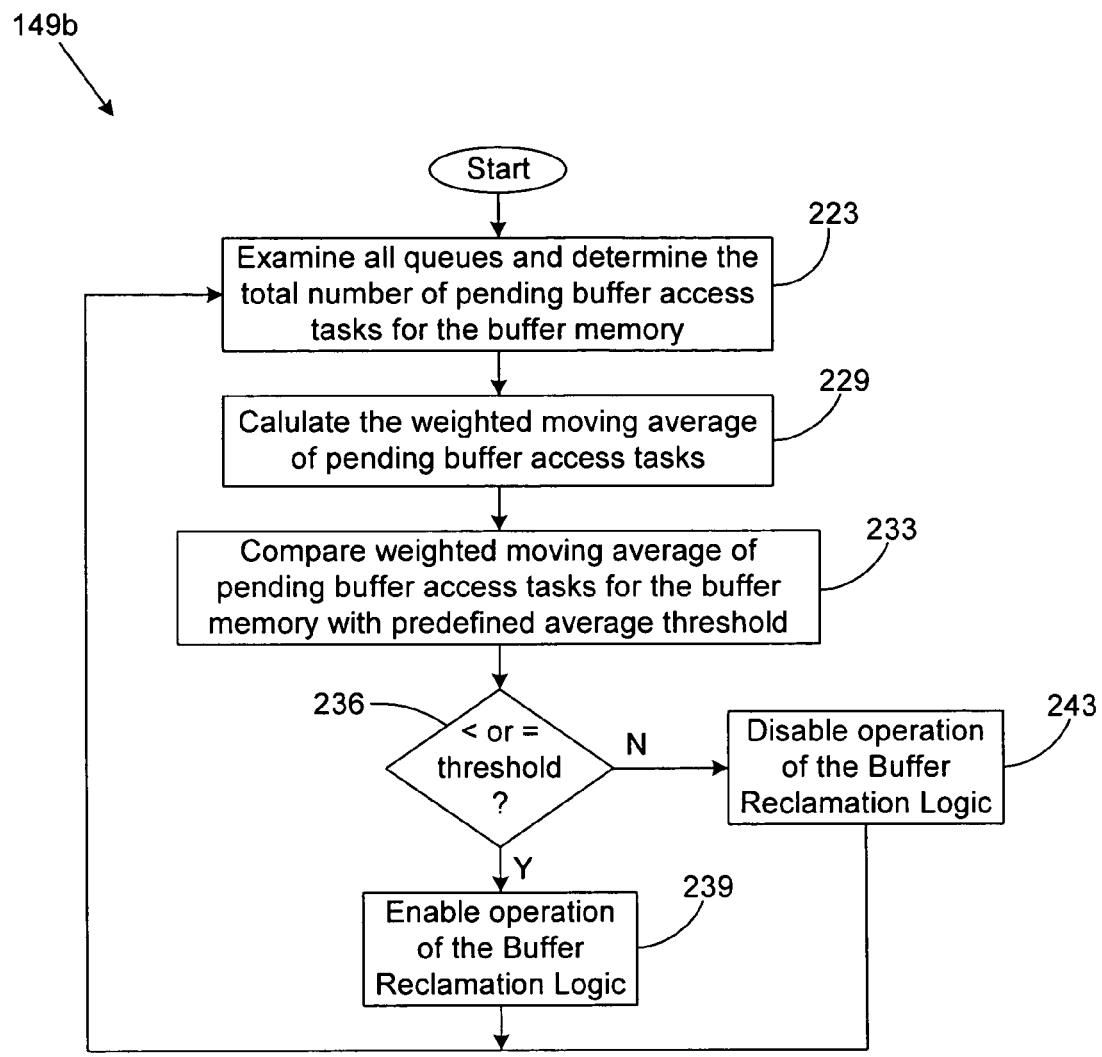
FIG. 3 is a flow chart that illustrates a second example of logic that controls the execution of buffer reclamation logic in the buffer access subsystem of FIG. 1 according to an embodiment of the present invention.

With reference to FIG. 3, shown is a second example of the operation of the buffer reclamation control logic 149, denoted herein as buffer reclamation control logic 149b, according to another embodiment of the present invention. Alternatively, the flow chart of FIG. 3 may be viewed as depicting a steps of method implemented to regulate the operation of the buffer reclamation logic in freeing segments 133 (FIG. 1) of the buffer memory 102 (FIG. 1) holding stale data, thereby regulating the submission of buffer access tasks 129 (FIG. 1) to the buffer memory 103 (FIG. 1) by the buffer reclamation logic 146 (FIG. 1).

Beginning with box 223, the buffer reclamation control logic 149*b* first examines all of the buffer queues 109, 113, 116 (FIG. 1) to determine the total number of pending buffer access tasks 129 destined for the buffer memory 103 that were generated by the buffer memory dependent devices 119, 123, 126 (FIG. 1).

Thereafter, in box 229, a weighted moving average of the pending buffer access tasks 129 is calculated. In this respect, the number of pending buffer access tasks 129 determined on a predefined number of previous occasions are stored in order to calculate the weighted moving average. In this manner, the buffer reclamation control logic 149*b* gauges or obtains a measure of the general level of buffer access activity on the part of the buffer memory dependent devices 119, 123, 126 according to the present embodiment. Thereafter, the weighted moving average calculated is compared with a predefined average threshold stored in a memory. In this respect, the user may specify a particular predefined average threshold above which it is deemed that the buffer access activity on the part of the buffer memory dependent devices 119, 123, 126 is at a level such that the buffer reclamation logic 146 is disabled thereby preventing the buffer reclamation logic 146 from performing tasks to reclaim or free segments 133 of the buffer memory 133 holding stale data by submitting buffer access tasks 129 to the buffer memory 103.

Next, in box 236, if the weighted moving average is less than or equal to the predefined average threshold, then the buffer reclamation control logic 149*b* proceeds to box 239 in which the operation of the buffer reclamation logic 146 is enabled, thereby allowing the buffer reclamation logic 146 to submit buffer access tasks 129 to the buffer memory 103. Thereafter, the buffer reclamation control logic 149*b* reverts back to box 223.

In this manner, the operation of the buffer reclamation logic 146 does not get in the way of the requests generated by the buffer memory dependent devices 119, 123, 126 unless the buffer access activity has dropped below the predefined level as defined by the predefined average threshold used to compare with the weighted moving average calculated above. By averaging the number of buffer access tasks 129 in the queues 109, 113, 116 over time, extended periods of low buffer access activity are more precisely identified within which to enable the operation of the buffer reclamation logic 146.

On the other hand, if in box 236, the weighted moving average is greater than the predefined average threshold, then the buffer reclamation control logic 149*b* proceeds to box 243 in which the operation of the buffer reclamation logic 146 is disabled, thereby preventing the buffer reclamation logic 146 from freeing segments 133 of the buffer memory 103 that hold stale data.

Figure 4:
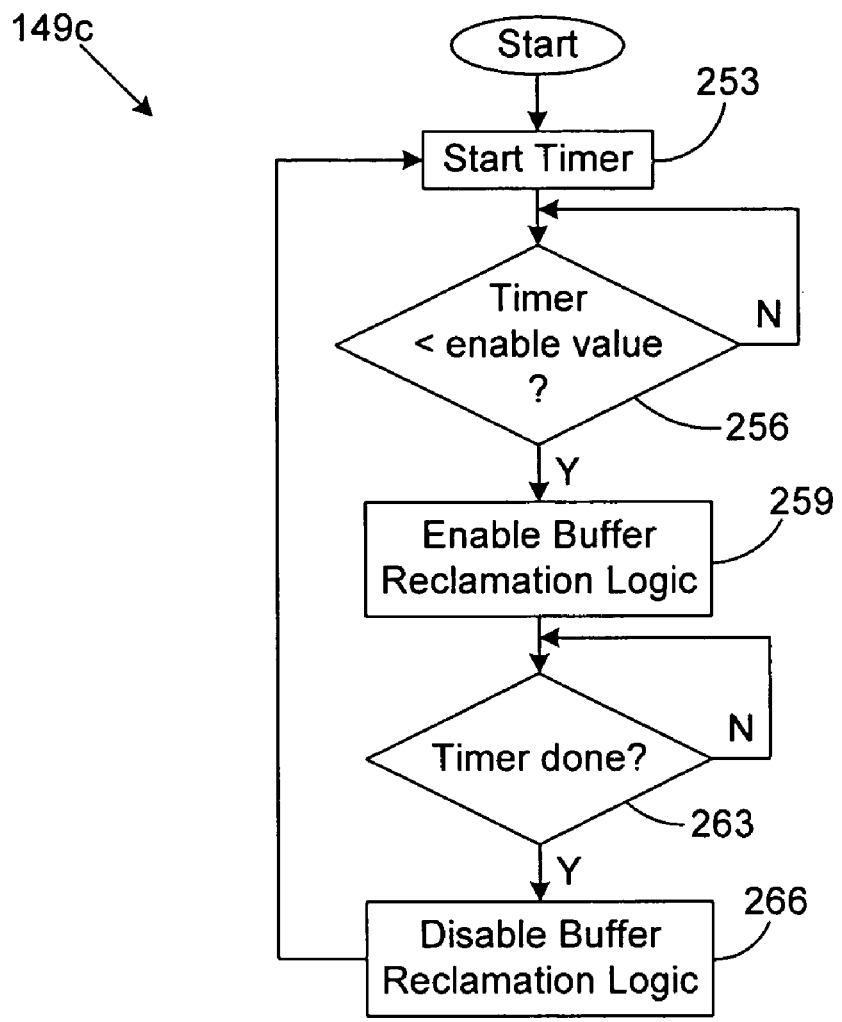
FIG. 4 is a flow chart that illustrates a third example of logic that controls the execution of buffer reclamation logic in the buffer access subsystem of FIG. 1 according to an embodiment of the present invention.

With reference to FIG. 4, shown is another example of the buffer reclamation control logic 149, denoted herein as buffer reclamation control logic 149*c*, according to still another embodiment of the present invention. Alternatively, the flow chart of FIG. 4 may be viewed as steps of a method that is implemented to control the operation of the buffer reclamation logic 146 (FIG. 1) in submitting buffer access tasks 129 (FIG. 1) to the buffer memory 103 (FIG. 1).

The buffer reclamation control logic 149*c* limits operation of the buffer reclamation logic 146 in freeing segments 133 (FIG. 1) of the buffer memory 103, and correspondingly, the total number of buffer access tasks 129 that the buffer reclamation logic 146 may submit to the buffer memory 103 during a predefined period of time. In this respect, the operation of the buffer reclamation logic 146 is restricted to a predefined window of time within a predefined period of time that is repeated continuously. That is to say, for example, for every minute, the buffer reclamation logic 146 may be enabled for a few seconds. This limits the amount of bandwidth that the buffer reclamation logic 146 takes up in submitting buffer access tasks 129 to the buffer memory 103 that thereby displace the buffer access tasks 129 submitted by the buffer memory dependent devices 119, 123, 126.

Beginning with box 253, the buffer reclamation control logic 149*c* starts a timer that counts from an initial value up to a final value that may be in time increments measured by seconds, microseconds, or milliseconds, or other time interval. In box 256, it is determined whether the current value held in the timer is less than an enabling value stored in a memory or register. If such is not the case, then the buffer reclamation control logic 149 waits at box 256 for the timer to count up to the enabling value. Assuming that the timer has counted up to the enabling value as determined in box 256, then in box 259 the buffer reclamation control logic 149*c* enables the operation of the buffer reclamation logic 146 to free segments 133 of the buffer memory 133 holding stale data, thereby allowing the buffer reclamation logic 146 to submit buffer access tasks 129 to the buffer memory 103. Thereafter, in box 263, the buffer reclamation control logic 149*c* waits until the timer is done counting. The timer is done counting when it has counted up to the final value. Assuming that the final value of the timer has been reached, then the buffer reclamation control logic 149*c* proceeds to box 266 in which the operation of the buffer reclamation logic is disabled. Thereafter, the buffer reclamation control logic 149*c* reverts back to box 253 to restart the timer.

In this manner, the buffer reclamation logic 146 is only allowed to operate or execute for a specific window of time within a predefined repeating cycle of time, thereby reducing the number of buffer access tasks 129 submitted by the buffer reclamation logic 146 over an extended period of time. Thus, the flow chart of FIG. 4 depicts an approach whereby a duty cycle is established within which the buffer reclamation logic 146 is enabled for only a portion of the whole timing cycle of the timer.

Figure 5:
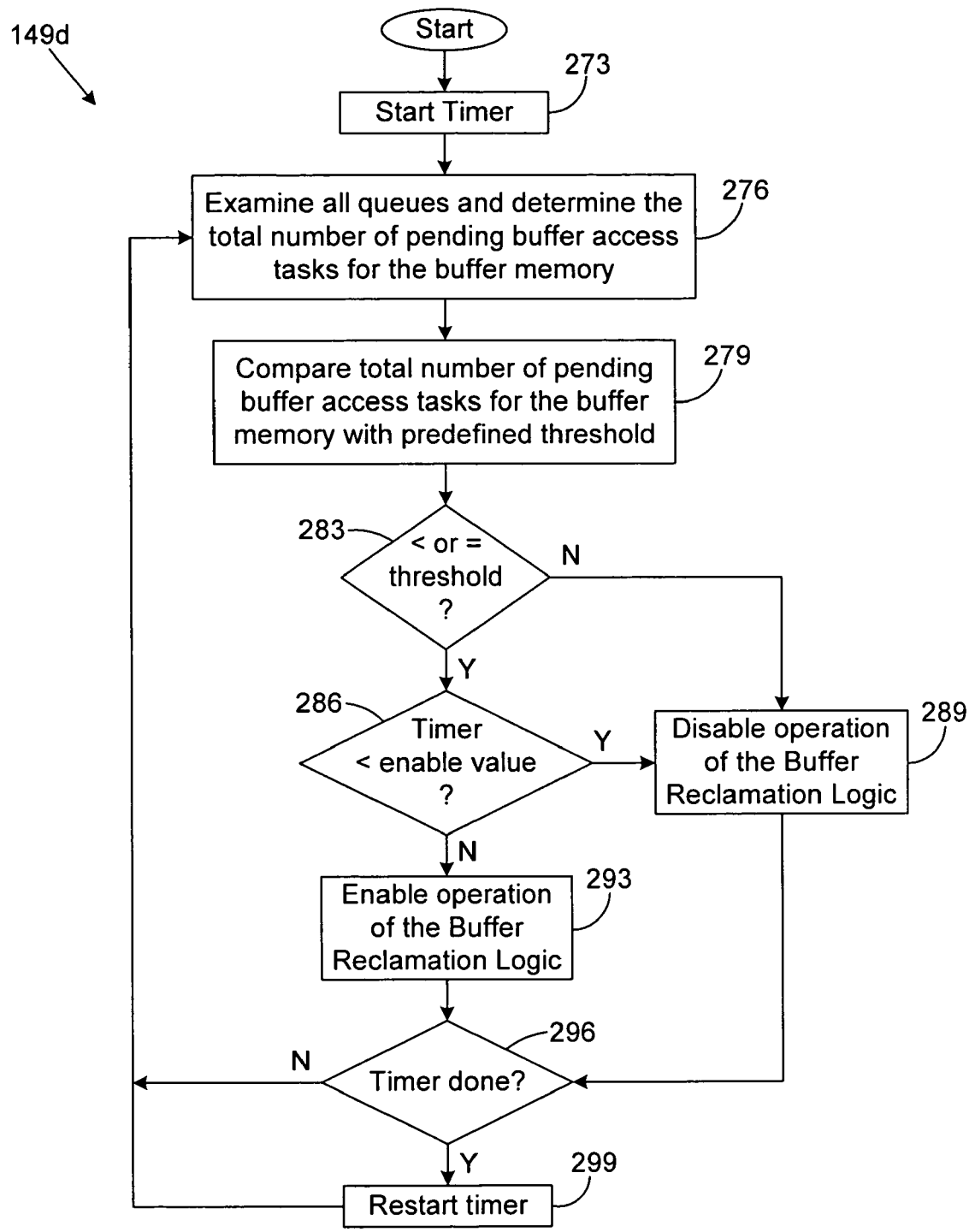
FIG. 5 is a flow chart that illustrates a fourth example of logic that controls the execution of buffer reclamation logic in the buffer access subsystem of FIG. 1 according to an embodiment of the present invention.

Referring next to FIG. 5, shown is a flow chart that provides still another example of the operation of the buffer reclamation control logic 149, denoted herein as buffer reclamation control logic 149*d*, according to an embodiment of the present invention. Alternatively, the flow chart of FIG. 5 may be viewed as depicting steps of a method implemented to control the operation of the buffer reclamation logic 146 (FIG. 1) in freeing segments 133 (FIG. 1) of the buffer memory 103 (FIG. 1) holding stale data, and correspondingly regulating the submission of buffer access tasks 129 (FIG. 1) by the buffer reclamation logic 146 to the buffer memory 103. The buffer reclamation control logic 149*d* provides a combination of both a threshold approach that gauges the level of buffer access activity on the part of the buffer memory dependent devices 119, 123, 126 (FIG. 1) by looking at the activity in the buffer queues 109, 113, 116 (FIG. 1) and by restricting the operation of the buffer reclamation logic 146 to a predefined window of time on a periodic basis.

To begin, in box 273, the buffer reclamation control logic 149*d* starts the operation of a timer which counts up to a final value from an initial value. Thereafter, in box 276 the buffer reclamation control logic 149*d* examines all of the queues 109, 113, 116 to determine the total number of pending buffer access tasks 129 included therein that are destined for the buffer memory 103. Thereafter, in box 279, the total number of pending buffer access tasks 129 in the buffer queues 109, 113, 116 are compared with a predefined threshold.

Thereafter, in box 283, the buffer reclamation control logic 149d determines whether the total number of pending buffer access tasks 129 identified in box 276 is less than or equal to the threshold of box 279. If the total number of buffer access tasks is less than or equal to the threshold, then the buffer reclamation control logic 149d proceeds to box 286. Otherwise, the buffer reclamation control logic 149d moves to box 289.

In box 286, the buffer reclamation control logic 149d determines whether the timer is less than an enabling value as was described with reference to FIG. 4. If so, then the buffer reclamation control logic 149d proceeds to box 289. Otherwise, the buffer reclamation control logic 149d proceeds to box 293 as shown. In box 289, the operation of the buffer reclamation logic 146 (FIG. 1) is disabled. In this respect, the buffer reclamation logic is disabled if the buffer access activity on the part of the buffer memory dependent devices 119, 123, 126 is greater than a particular threshold, or if the timer has not reached an enabling value. Assuming however that the timer has reached an enable value in box 286, then the buffer reclamation control logic 149d proceeds to box 293 in which the operation of the buffer reclamation logic 146 is enabled or thereby allowing the buffer reclamation logic 146 to submit buffer access tasks 129 to the buffer memory 103. In this respect, the operation of the buffer reclamation logic 146 is enabled when the number of buffer access tasks 129 in the buffer queues 109, 113, 116 falls below the predefined threshold of box 279 and if the timer has reached an enabling value in box 286. Thus, two conditions are provided and are used to limit the operation of the buffer reclamation control logic 146. From box 293, or 289, the buffer reclamation control logic 149d proceeds to box 296 in which it is determined whether the timer has completed counting up to its final value. If so, then the buffer reclamation control logic 149d proceeds to box 299 in which the timer is restarted. Otherwise, the buffer reclamation control logic 149d reverts back to box 276. Once the timer has been restarted in box 299, then the buffer reclamation control logic 149d reverts back to box 276 as shown.

In addition, it is understood that the threshold that is examined in box 279 above may be a predefined average threshold and that the buffer reclamation control logic 149d may calculate a weighted moving average of the total number of buffer access tasks 129 stored in the buffer queues 109, 113, 116 in a manner similar as discussed with reference to FIG. 3. In this respect, box 229 of FIG. 3 may be inserted between box 276 and box 279 above accordingly.

Figure 6:
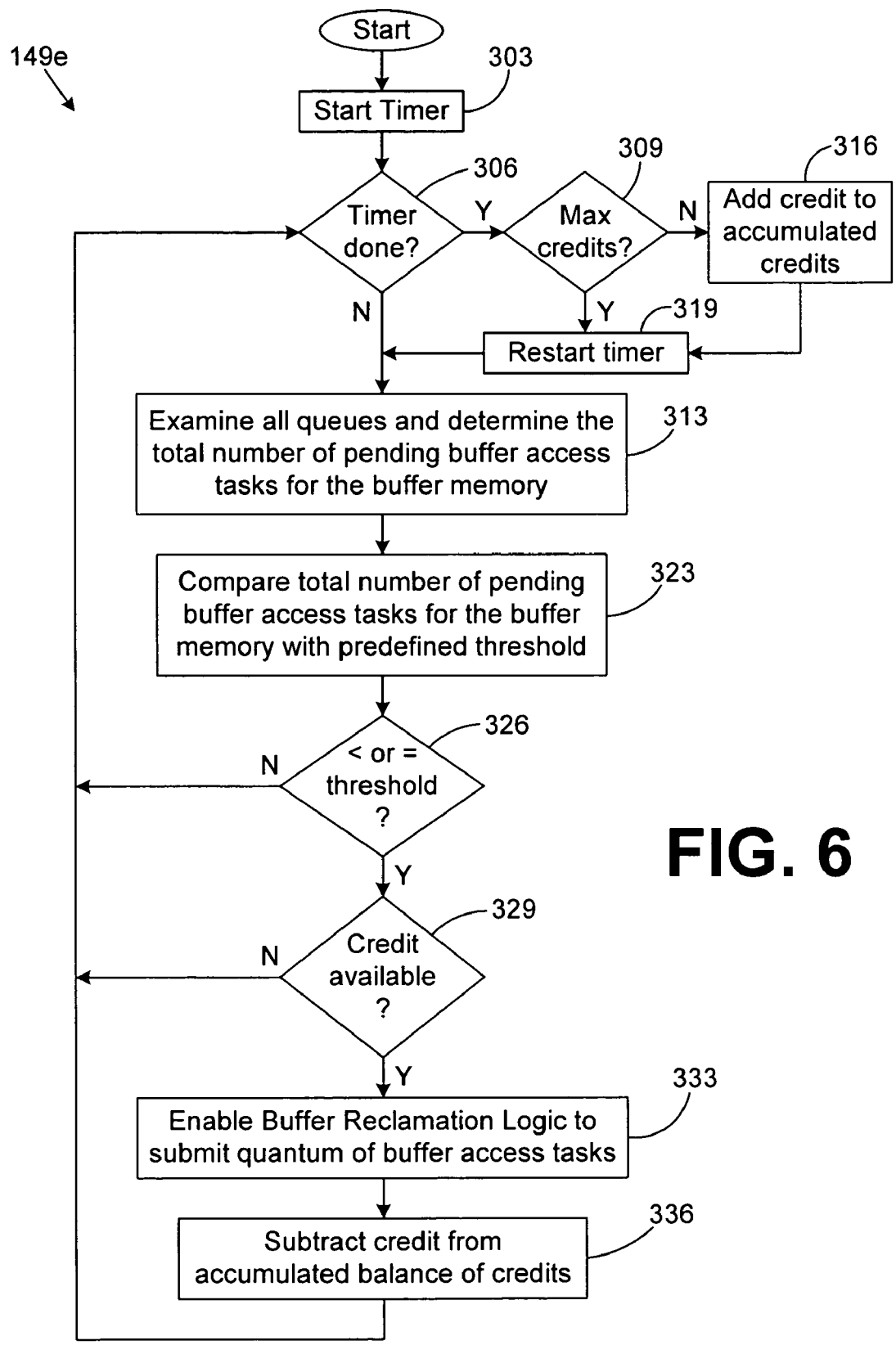
FIG. 6 is a flow chart that illustrates a fifth example of logic that controls the execution of buffer reclamation logic in the buffer access subsystem of FIG. 1 according to an embodiment of the present invention.

With reference to FIG. 6, shown is another example of the operation of the buffer reclamation control logic 149, denoted herein as the buffer reclamation control logic 149e, according to another embodiment of the present invention. Alternatively, the flow chart of FIG. 6 may be viewed as depicting steps in the method implemented in order to restrict the operation of the reclamation control logic 146 (FIG. 1) employing a combination of a time limit to the operation of the reclamation control logic 146 and a threshold measurement of the buffer access activity of the buffer memory 103 (FIG. 1) as will be described.

Beginning with box 303, a timer that tracks a predefined period of time is started. Thereafter in box 306, the buffer reclamation control logic 149e determines whether the timer started in box 303 has counted up to its final value, thereby indicating that a predefined period of time has elapsed. If so, then the buffer reclamation control logic 149e proceeds to box 309. Otherwise, the buffer reclamation control logic 149e proceeds to box 313. In box 309, the buffer reclamation control logic 149e determines whether a maximum balance of credits has been accumulated, where the credits are employed to enable the buffer reclamation logic 146. If not, then the buffer reclamation control logic 149e proceeds to box 316. Otherwise, the buffer reclamation control logic 149e moves to box 319.

In box 316, a credit is added to the cumulated balance of credits that is stored in a memory associated with the buffer access subsystem 100 (FIG. 1). Thereafter in box 319, the timer is restarted to count up to the final value once again, thereby tracking another cycling of the predefined period of time. Thereafter the buffer reclamation control logic 149e proceeds to box 313.

In box 313, the buffer reclamation control logic 149e examines all of the buffer queues 109, 113, 116 to determine the total number of pending buffer access tasks 129 that are destined for the buffer memory 103, having been generated by the buffer memory dependent devices 119, 123, 126. Thereafter, in box 323, the total number of pending buffer access tasks 129 determined in box 313 is compared with a predefined threshold.

Thereafter, in box 326 the buffer reclamation control logic 149e determines whether the total number of buffer access tasks 129 determined in box 313 is less than or equal to the predefined threshold of box 323. If the total number is less than or equal to the predefined threshold, then the buffer reclamation control logic 149e reverts back to box 306. Otherwise, the buffer reclamation control logic 149e proceeds to box 329.

In box 329, the buffer reclamation control logic 149e determines whether a quantum of credits are available within the current balance of credits that allow for the submission of a quantum of buffer access tasks 129 by the buffer reclamation logic 146 to the buffer memory 103 during the course of freeing one or more segments 133 of the buffer memory 103 holding stale data. Thereafter, in box 336, the quantum of credits associated with the submission of buffer access tasks 129 with the buffer memory in box 333 is subtracted from the cumulated balance of credits stored in the memory associated with the buffer access subsystem 100 (FIG. 1). Thereafter the buffer reclamation control logic 149e reverts back to box 306 as shown.

In addition, the boxes 313, 323, 326 may be replaced by boxes 223 through boxes 236 (FIG. 3) in order to use a comparison with an average threshold, where the total number of buffer access tasks stored in the queues 109, 113, 116 is averaged over a period of time as described above. As an additional alternative, boxes 313, 323, and 326 may be eliminated from the flow chart of FIG. 6 entirely where box 306 and box 319 proceed directly to box 329. In this respect, the buffer reclamation logic 146 is enabled based upon the existence of a balance of a quantum of credits and does not take into account the current buffer access activity on the part of the buffer memory dependent devices 119, 123, 126.

Figure 7:
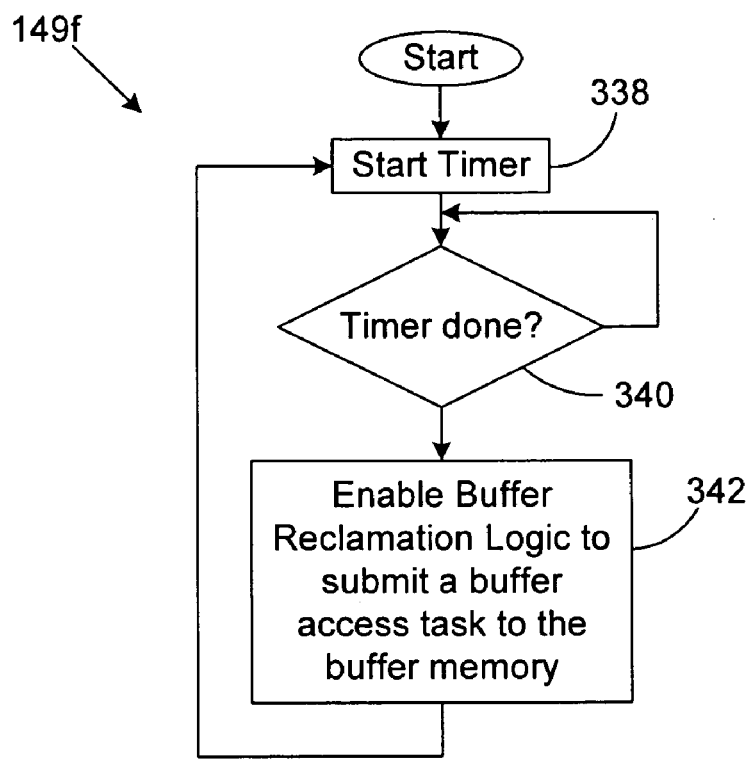
FIG. 7 is a flow chart that illustrates a sixth example of logic that controls the execution of buffer reclamation logic in the buffer access subsystem of FIG. 1 according to an embodiment of the present invention.

With reference to FIG. 7, shown is another example of the operation of the buffer reclamation control logic 149, denoted herein as the buffer reclamation control logic 149f, according to another embodiment of the present invention. Alternatively, the flow chart of FIG. 7 may be viewed as depicting steps in the method implemented in order to restrict the operation of the reclamation control logic 146 (FIG. 1) employing a repeating timer that restricts the number of network access tasks 129 (FIG. 1) the buffer reclamation logic 146 may submit to the buffer memory 103 (FIG. 1) over a specific period of time.

Beginning with box 338, a timer is started. The timer essentially tracks the passage of a predefined period of time, or stated another way, the timer counts down a predefined period of time. The predefined period of time may be any length, such as, for example, a few milliseconds, seconds, or other period of time. Then, in box 340, the buffer reclamation control logic 149f waits for the timer to finish counting down the period of time such that the predefined period of time has elapsed. Assuming that the timer is done in box 340, then next in box 342 the buffer reclamation control logic 149f enables the buffer reclamation logic 146 to submit a predefined number of buffer access tasks 129 to the buffer memory 103. The predefined number of buffer access tasks 129 may be any number of buffer access tasks 129. Then, the buffer reclamation control logic 149f reverts back to box 338 to restart the timer. In this respect, the timer is repeatedly cycled and the buffer reclamation control logic 149f enables the buffer reclamation logic 146 to submit a buffer access task 129 to the buffer memory 103 after each cycling of the timer.

Figure 8:
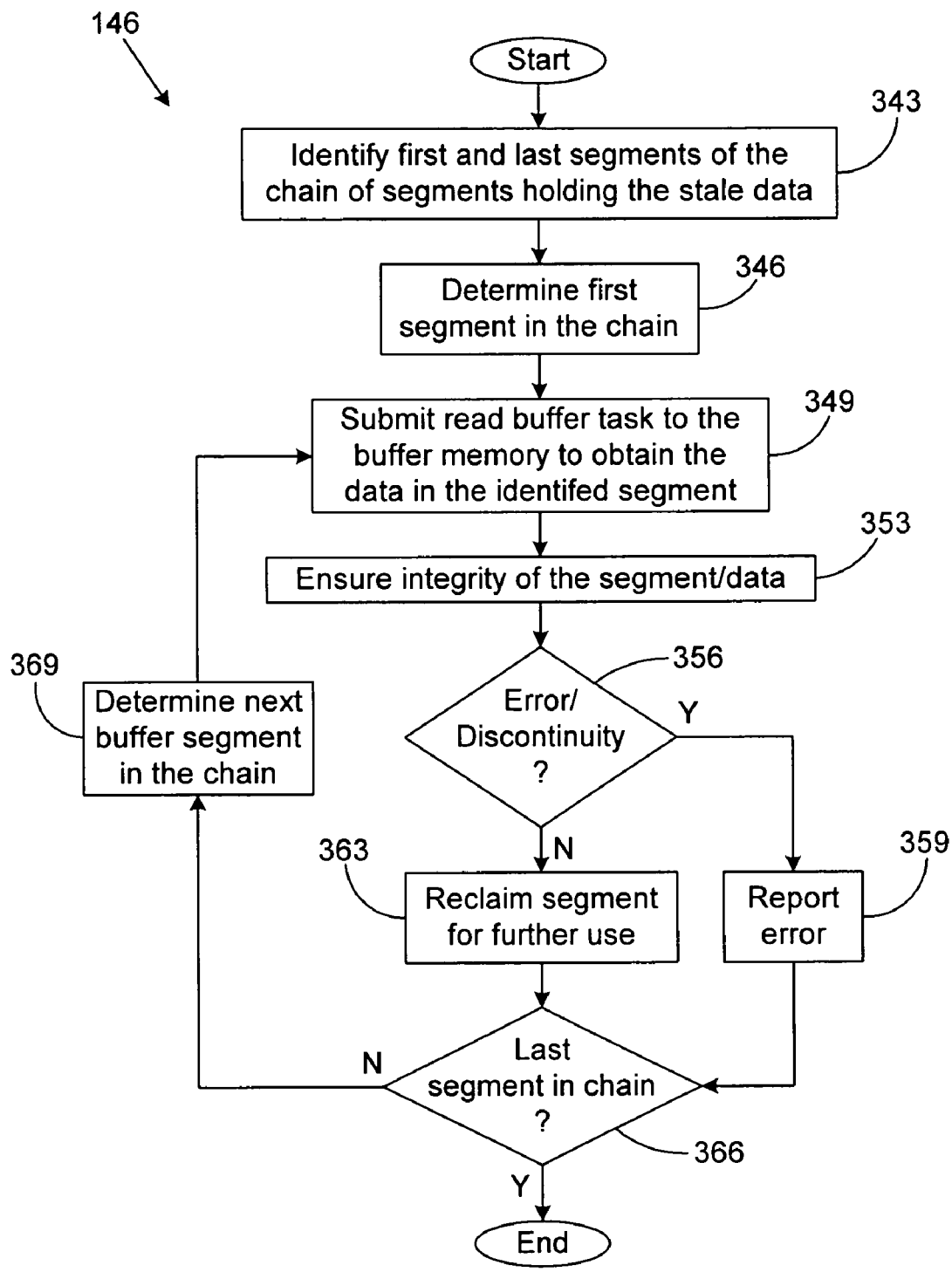
FIG. 8 is a flow chart that illustrates an example of logic that reclaims segments of a buffer memory in the buffer access subsystem of FIG. 1 according to an embodiment of the present invention.

With reference to FIG. 8, shown is an example of the operation of the buffer reclamation logic 146 according to an embodiment of the present invention. Alternatively, the flow chart of FIG. 8 may be viewed as depicting steps of a method implemented in order to reclaim or free segments 133 (FIG. 1) of the buffer memory 103 (FIG. 1) that hold stale data as identified by the indication of the stale data placed in the buffer reclamation queue 156 (FIG. 1) from which the buffer reclamation logic 146 operates.

Beginning with box 343, the buffer reclamation logic 146 identifies the memory locations within the buffer memory 103 (i.e. which segments 133 of the buffer memory 103) contain the first and last segments 133 of a chain of segments 133 that hold an entire amount of stale data from a buffer reclamation task obtained from the buffer reclamation queue 156. Thereafter, in box 346, a first segment 133 of all segments 133 that hold the stale data is identified. Next, in box 349, a read buffer task 129 is submitted to the buffer memory 103 to obtain the data in the segment 133 identified in the read buffer task itself. In this respect, by virtue of whether the buffer reclamation logic 146 is enabled, the buffer reclamation logic 146 is allowed or prevented from submitting a read buffer task 129 to the buffer memory 103 based upon the operation of the buffer reclamation control logic 149 as described with reference to the previous embodiments of the present invention, for example, of FIGS. 2-7.

Thereafter, in box 353, the buffer reclamation logic 146 takes steps to ensure the integrity of the data contained within the current segment 133. In this respect, the buffer reclamation logic 146 may detect any one of a number of potential problems with the data contained in the segment 133 as well as a discontinuity in the chain of segments holding the entire amount of stale data itself. For example, the buffer reclamation logic 146 may detect if the data contained in the segment 133 has been stored in an incorrect class of the buffer memory 103, where the segments 133 of the buffer memory 103 are separated into various classes, each class being used for the storage of one or more predefined types of data. Also, in additional examples, the buffer reclamation logic 146 may detect if an identifier associated with the data stored in the segment 133 is incorrect, or the buffer reclamation logic 146 may detect if the address of the segment 133 in the buffer memory 103 is valid, etc.

Thereafter, in box 356, if an error or discontinuity in the chain of segments is identified, then the buffer reclamation logic 146 proceeds to box 359. Otherwise the buffer reclamation logic 146 proceeds to box 363. It may be possible that for some types of errors detected, that the buffer reclamation logic 146 may still proceed to box 363 rather than box 359 if the reclamation of the corresponding segment 133 of the buffer memory 103 will not cause future data problems. In box 359, the buffer reclamation logic 146 issues a report or logs a report in a particular log that identifies a particular problem or discontinuity experienced. Thereafter, the buffer reclamation logic 146 proceeds to box 366 as shown.

Referring back to box 366, the buffer reclamation logic 146 then takes steps to reclaim the particular segment 133 of the buffer memory 103 for further use by the processor circuit that is associated with the buffer access subsystem 100 (FIG. 1). This may comprise, for example, returning the address associated with the segment 133 of the buffer memory 103 to a pool of available memory segments 133 for use in storing data, etc. Thereafter, the buffer reclamation logic 146 proceeds to box 366. In box 366, it is determined whether the last segment in the chain has been processed. If such is the case then the buffer reclamation logic 146 ends accordingly. Otherwise, the buffer reclamation logic 146 proceeds to box 369 in which the next segment in the chain of segments holding the stale data is identified for processing. Thereafter, the buffer reclamation logic 146 reverts back to box 349. It is noted that the operation of the buffer reclamation logic 146 may be disabled at any time during the flow shown with respect to FIG. 8. In such case, the buffer reclamation logic 146 would continue operation where it left off when enabled.

It is understood that the various flow charts of FIGS. 2-8 depict examples of the operation of the buffer reclamation logic 146 and the buffer reclamation control logic 149. In this respect, differing approaches that accomplish the same tasks or that essentially facilitate the same functionality may be implemented as may be appreciated by those with ordinary skill in the art.

The block flow charts of FIGS. 2-8 show the architecture, functionality, and operation of an implementation of the buffer reclamation logic 146 and the buffer reclamation control logic 149. Although the flow charts of FIGS. 2-8 show a specific order of execution, it is understood that the order of execution may differ from that which is depicted. For example, the order of execution of two or more blocks may be scrambled relative to the order shown. Also, two or more blocks shown in succession in FIGS. 2-8 may be executed concurrently or with partial concurrence.

Also, if the buffer reclamation logic 146 and/or the buffer reclamation control logic 149, or any portion thereof, are embodied in code such as software or firmware, each can be embodied in any computer-readable medium for use by or in connection with an instruction execution system such as, for example, a processor in a computer system or other system. In this sense, the buffer reclamation logic 146 and/or the buffer reclamation control logic 149, or any portion thereof may comprise, for example, statements including instructions and declarations that can be fetched from the computer-readable medium and executed by the instruction execution system. In the context of the present invention, a "computer-readable medium" can be any medium that can contain, store, or maintain the buffer reclamation logic 146 and/or the buffer reclamation control logic 149 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A buffer memory management system, comprising:
    a buffer memory;
    at least one queue being configured to store a number of buffer access tasks;
    buffer reclamation logic configured to free at least one segment of the buffer memory holding an amount of stale data;
    a timer configured to repeatedly cycle through a predefined period of time; and
    buffer reclamation control logic that enables the buffer reclamation logic to submit a buffer access task to the buffer memory based upon a total number of the buffer access tasks stored in the at least one queue, and the buffer reclamation control logic further enabling the buffer reclamation logic to submit a redefined number of buffer access tasks to the buffer memory after each cycling of the timer.

2. The buffer memory management system of claim 1, wherein the buffer access tasks further comprises a buffer read task.

3. The buffer memory management system of claim 1, wherein the buffer access tasks further comprises a buffer write task.

4. The buffer memory management system of claim 1, wherein the buffer reclamation control logic further comprises logic that enables the buffer reclamation logic to submit the buffer access task to the buffer memory if the total number of the buffer access tasks stored in the at least one queue is less than a predefined threshold.

5. The buffer memory management system of claim 4, where the predefined period of time further comprises a first predefined period of time, wherein the buffer reclamation control logic further comprises logic that limits a total number of buffer access tasks that the buffer reclamation logic may submit to the buffer memory during a second predefined period of time.

6. The buffer memory management system of claim 5, wherein the logic that limits the total number of buffer access tasks that the buffer reclamation logic may submit to the buffer memory during the second predefined period of time further comprises:
    logic that issues a number of buffer access credits after a lapse of the second predefined period of time; and
    logic that allows the enabling of the buffer reclamation logic to free the at least one segment of the buffer memory only upon an existence of a balance of a predefined number of the buffer access credits.

7. The buffer memory management system of claim 5, wherein the logic that limits the total number of buffer access tasks that the buffer reclamation logic may submit to the buffer memory during the second predefined period of time further comprises logic that restricts the enabling of the buffer reclamation logic to free the at least one segment of the buffer memory to a predefined window of time within the second predefined period of time.

8. The buffer memory management system of claim 1, wherein the buffer reclamation control logic further comprises logic that generates a weighted moving average of the total number of the buffer access tasks stored in the at least one queue over a period of time.

9. The buffer memory management system of claim 8, wherein the buffer reclamation control logic further comprises logic that enables the buffer reclamation logic to submit the buffer access task to the buffer memory if the weighted moving average of the total number of the buffer access tasks stored in the at least one queue is less than a predefined average threshold.

10. The buffer memory management system of claim 9, where the predefined period of time further comprises a first predefined period of time, wherein the buffer reclamation control logic further comprises logic that limits a total number of buffer access tasks that the buffer reclamation logic may submit to the buffer memory during a second predefined period of time.

11. The buffer memory management system of claim 10, wherein the logic that limits the total number of buffer access tasks that the buffer reclamation logic may submit to the buffer memory during the second predefined period of time further comprises:
    logic that issues a number of buffer access credits after a lapse of the second predefined period of time; and
    logic that allows the enabling of the buffer reclamation logic to free the at least one segment of the buffer memory only upon an existence of a balance of a predefined number of the buffer access credits.

12. The buffer memory management system of claim 11, wherein the logic that limits the total number of buffer access tasks that the buffer reclamation logic may submit to the buffer memory during the second predefined period of time further comprises logic that eliminates the predefined number of buffer access credits from the balance in association with the freeing of the at least one segment of the buffer memory.

13. The buffer memory management system of claim 10, wherein the logic that limits the total number of buffer access tasks that the buffer reclamation logic may submit to the buffer memory during the second predefined period of time further comprises logic that restricts the enabling of the buffer reclamation logic to free the at least one segment of the buffer memory to a predefined window of time within the second predefined period of time.

14. The buffer memory management system of claim 1, further comprising a number of queues and an arbiter, each of the queues being coupled to the arbiter, and the arbiter being coupled to the buffer memory, wherein the arbiter permits a single threaded access to the buffer memory to implement each of the buffer access tasks.

15. The buffer memory management system of claim 14, wherein one of the queues is associated with the buffer reclamation logic, the one of the queues being configured to store a number of buffer access requests from the buffer reclamation logic, wherein an execution of one of the buffer access requests from the buffer reclamation logic displaces an execution of the buffer access tasks stored in the remaining ones of the queues.

16. The buffer memory management system of claim 1, wherein:
    the amount of stale data is stored in a number of segments of the buffer memory; and the buffer reclamation logic further comprises logic that detects a segment-to-segment discontinuity of the amount of stale data stored in the number of the segments of the buffer memory.

17. The buffer memory management system of claim 16, wherein the buffer reclamation logic is further configured not to free the at least one segment of the buffer memory holding the amount of stale data that is subject to the segment-to-segment discontinuity.

18. A system for management of a buffer memory comprising:
a buffer memory;
means for generating a measure of a level of buffer access activity of the buffer memory at a given time by at least one device;
a timer configured to repeatedly cycle through a predefined period of time; and
means for freeing at least one segment of the buffer memory holding an amount of stale data for future data storage if the measure of the level of buffer access activity is less than a predefined threshold, where the means for freeing further comprises means for submitting buffer access tasks to the buffer memory to free the at least one segment after each cycling of the timer.

19. The system of claim 18, wherein the means for generating the measure of the level of buffer access activity of the buffer memory at the given time by the at least one device further comprises means for determining a total number of the buffer access tasks stored in at least one queue associated with the buffer memory at the given time.

20. The system of claim 19, wherein the means for freeing the at least one segment of the buffer memory holding the amount of stale data for future data storage if the measure of the level of buffer access activity is less than the predefined threshold further comprises means for submitting at least one reclamation buffer access task to the buffer memory if the total number of the buffer access tasks stored in the at least one queue is less than the predefined threshold, the reclamation buffer access task being associated with the freeing of the at least one segment of the buffer memory.

21. The system of claim 18, wherein the means for generating the measure of the level of buffer access activity of the buffer memory at the given time by the at least one device further comprises means for calculating a weighted moving average of a total number of buffer access tasks stored in at least one queue associated with the buffer memory over a period of time.

22. The system of claim 21, wherein the means for freeing the at least one segment of the buffer memory holding the amount of stale data for future data storage if the measure of the level of buffer access activity is less than the predefined threshold further comprises means for submitting at least one reclamation buffer access task to the buffer memory if the weighted moving average is less than a predefined average threshold, wherein the reclamation buffer access task is associated with the freeing of the at least one segment of the buffer memory.

23. A method for management of a buffer memory, comprising the steps of:
generating a measure of a level of buffer access activity of the buffer memory at a given time by at least one device; and
freeing at least one segment of the buffer memory holding an amount of stale data for future data storage if the measure of the level of buffer access activity is less than a predefined threshold;
repeatedly cycling a timer that counts down a predefined period of time; and
enabling the freeing of the at least one segment of the buffer memory holding an amount of stale data by allowing the submission of a redefined number of buffer access tasks associated with the freeing of the at least one segment to the buffer memory after each cycling of the timer.

24. The method of claim 23, wherein the step of generating the measure of the level of buffer access activity of the buffer memory at the given time by the at least one device further comprises the step of determining a total number of the buffer access tasks stored in at least one queue associated with the buffer memory at the given time.

25. The method of claim 24, wherein the step of freeing the at least one segment of the buffer memory holding the amount of stale data for future data storage if the measure of the level of buffer access activity is less than the predefined threshold further comprises the step of submitting at least one reclamation buffer access task to the buffer memory if the total number of the buffer access tasks stored in the at least one queue is less than the predefined threshold, wherein the reclamation buffer access task is associated with the freeing of the at least one segment of the buffer memory.

26. The method of claim 25, further comprising the step of limiting a total number of reclamation buffer access tasks that are submitted to the buffer memory during a predefined period of time.

27. The method of claim 26, wherein the step of limiting the total number of reclamation buffer access tasks that are submitted to the buffer memory during the predefined period of time further comprises the step of issuing a number of buffer access credits after a lapse of the predefined period of time, wherein the step of submitting the at least one reclamation buffer access task to the buffer memory is performed only if a balance of a predefined number of the buffer access credits exists.

28. The method of claim 26, wherein the step of the total number of reclamation buffer access tasks that are submitted to the buffer memory during the predefined period of time are limited by only allowing the at least one reclamation buffer access task to be submitted to the buffer memory within a predefined window of time within the predefined period of time.

29. The method of claim 23, wherein the step of generating the measure of the level of buffer access activity of the buffer memory at the given time by the at least one device further comprising the step of calculating a weighted moving average of a total number of buffer access tasks stored in at least one queue associated with the buffer memory over a period of time.

30. The method of claim 29, wherein the step of freeing the at least one segment of the buffer memory holding the amount of stale data for future data storage if the measure of the level of buffer access activity is less than the predefined threshold further comprises the step of submitting at least one reclamation buffer access task to the buffer memory if the weighted moving average is less than a predefined average threshold, wherein the reclamation buffer access task is associated with the freeing of the at least one segment of the buffer memory.

31. The method of claim 30, where the predefined period of time further comprises a first predefined period of time, the method further comprising the step of limiting a total number of reclamation buffer access tasks that are submitted to the buffer memory during a second predefined period of time.

32. The method of claim 31, wherein the step of limiting the total number of reclamation buffer access tasks that are submitted to the buffer memory during the second predefined period of time further comprises the step of issuing a number of buffer access credits after a lapse of the second predefined period of time, wherein the step of submitting the at least one reclamation buffer access task to the buffer memory is performed only if a balance of a predefined number of the buffer access credits exists.

33. The method of claim 31, wherein the total number of reclamation buffer access tasks that are submitted to the buffer memory during the second predefined period of time are limited by only allowing the at least one reclamation buffer access task to be submitted to the buffer memory within a predefined window of time within the second predefined period of time.

34. The method of claim 23, further comprising the step of limiting access to the buffer memory to a single thread at a time for the execution of each one of a number of buffer access tasks.

35. The method of claim 23, further comprising the steps of:
   storing the amount of stale data in a number of segments of the buffer memory; and
   detecting a segment-to-segment discontinuity in the amount of stale data stored in a number of the segments of the buffer memory.

36. The method of claim 35, wherein the step of freeing the at least one segment of the buffer memory holding the amount of stale data for future data storage is only performed if the at least one segment of the buffer memory is not subject to the segment-to-segment discontinuity.

* * * * *